(12) United States Patent
Viteri et al.

(10) Patent No.: US 6,868,677 B2
(45) Date of Patent: Mar. 22, 2005

(54) COMBINED FUEL CELL AND FUEL COMBUSTION POWER GENERATION SYSTEMS

(75) Inventors: Fermin Viteri, Sacramento, CA (US); Roger E. Anderson, Gold River, CA (US)

(73) Assignee: Clean Energy Systems, Inc., Rancho Cordova, CA (US)

( * ) Notice: Subject to any disclaimer, the term of this patent is extended or adjusted under 35 U.S.C. 154(b) by 17 days.

(21) Appl. No.: 10/155,932

(22) Filed: May 24, 2002

(65) Prior Publication Data

US 2002/0174659 A1 Nov. 28, 2002

Related U.S. Application Data

(60) Provisional application No. 60/293,885, filed on May 24, 2001, provisional application No. 60/293,886, filed on May 24, 2001, provisional application No. 60/293,887, filed on May 24, 2001, and provisional application No. 60/293,895, filed on May 24, 2001.

(51) Int. Cl.$^7$ ............................................... F02C 6/04
(52) U.S. Cl. ..................... 60/784; 60/39.12; 60/39.5
(58) Field of Search ............................... 60/783, 39.12, 60/39.5, 784

(56) References Cited

U.S. PATENT DOCUMENTS

| | | |
|---|---|---|
| 864,017 A | 8/1907 | Miller |
| 886,274 A | 4/1908 | Tate |
| 1,013,907 A | 1/1912 | Taylor |
| 1,227,275 A | 5/1917 | Kraus |
| 1,372,121 A | 3/1921 | Davis |
| 1,820,755 A | 8/1931 | McMullen |
| 1,828,784 A | 10/1931 | Perrin |
| 2,004,317 A | 6/1935 | Forster |
| 2,033,010 A | 3/1936 | Russell |
| 2,078,956 A | 5/1937 | Lysholm |

(List continued on next page.)

FOREIGN PATENT DOCUMENTS

| | | |
|---|---|---|
| DE | 1301821 | 8/1969 |
| DE | 2933932 | 12/1982 |
| DE | 3512947 | 10/1986 |
| EP | 86104859.3 | 4/1986 |
| EP | 92120907.8 | 12/1992 |
| EP | 94305077.3 | 1/1995 |
| FR | 350612 | 1/1905 |
| GB | 6394 | 5/1898 |
| GB | 140516 | 3/1920 |
| GB | 271706 | 5/1927 |
| GB | 2111602 | 7/1983 |
| WO | WO 91/02886 | 3/1991 |
| WO | WO 94/10427 | 5/1994 |
| WO | WO 96/07024 | 3/1996 |
| WO | WO 97/44574 | 11/1997 |
| WO | WO 99/22127 | 5/1999 |
| WO | WO 99/63210 | 12/1999 |

OTHER PUBLICATIONS

Brauser, S. et al.; A Proposed Hydrogen–Oxygen Power Cycle; 1967; Stillwater, Oklahoma.

(List continued on next page.)

Primary Examiner—Charles G. Freay
(74) Attorney, Agent, or Firm—Heisler & Associates

(57) ABSTRACT

A power generation system is provided which converts chemical energy in one or more fuels into electrical and/or mechanical power. The system includes both fuel cells to directly convert electrical energy in a fuel into electrical power and at lest one combustor and expander to generate mechanical power, optionally than converted to electrical power in a generator. Fuel cell products disclosed from the fuel cell are entered into the combustor to be heated along with products of combustion created in the combustor and expanded in the expander along with the products of combustion.

6 Claims, 5 Drawing Sheets

U.S. PATENT DOCUMENTS

| | | |
|---|---|---|
| 2,168,313 A | 8/1939 | Bichowsky |
| 2,218,281 A | 10/1940 | Ridder |
| 2,359,108 A | 9/1944 | Hoskins |
| 2,368,827 A | 2/1945 | Hanson |
| 2,374,710 A | 5/1945 | Smith |
| 2,417,835 A | 3/1947 | Moore |
| 2,428,136 A | 9/1947 | Barr |
| 2,469,238 A | 5/1949 | Newton |
| 2,476,031 A | 7/1949 | Farkas |
| 2,478,682 A | 8/1949 | Blackwood |
| 2,487,435 A | 11/1949 | Goddard |
| 2,523,656 A | 9/1950 | Goddard |
| 2,547,093 A | 4/1951 | Ray |
| 2,563,028 A | 8/1951 | Goddard |
| 2,568,787 A | 9/1951 | Bosch |
| 2,582,938 A | 1/1952 | Eastman |
| 2,605,610 A | 8/1952 | Hermitte |
| 2,621,475 A | 12/1952 | Loy |
| 2,636,345 A | 4/1953 | Zoller |
| 2,654,217 A | 10/1953 | Rettaliata |
| 2,656,677 A | 10/1953 | Peterson |
| 2,662,373 A | 12/1953 | Sherry |
| 2,678,531 A | 5/1954 | Miller |
| 2,678,532 A | 5/1954 | Miller |
| 2,697,482 A | 12/1954 | Blizard |
| 2,717,491 A | 9/1955 | Barr |
| 2,722,100 A | 11/1955 | Goddard |
| 2,763,987 A | 9/1956 | Kretschmer |
| 2,770,097 A | 11/1956 | Walker |
| 2,832,194 A | 4/1958 | Kuhner |
| 2,869,324 A | 1/1959 | Foote |
| 2,884,912 A | 5/1959 | Lewis |
| 2,916,877 A | 12/1959 | Walter |
| 2,986,882 A | 6/1961 | Pavlecka |
| 3,038,308 A | 6/1962 | Fuller |
| 3,054,257 A | 9/1962 | Schelp |
| 3,101,592 A | 8/1963 | Robertson |
| 3,134,228 A | 5/1964 | Wolansky |
| 3,183,864 A | 5/1965 | Stengel |
| 3,238,719 A | 3/1966 | Harslem |
| 3,298,176 A | 1/1967 | Forsyth |
| 3,302,596 A | 2/1967 | Zinn |
| 3,315,467 A | 4/1967 | DeWitt |
| 3,331,671 A | 7/1967 | Goodwin |
| 3,335,565 A | 8/1967 | Aguet |
| 3,359,723 A | 12/1967 | Bohensky |
| 3,385,381 A | 5/1968 | Calaman |
| 3,423,028 A | 1/1969 | Stupakis |
| 3,459,953 A | 8/1969 | Hughes |
| 3,559,402 A | 2/1971 | Stone |
| 3,574,507 A | 4/1971 | Kydd |
| 3,608,529 A | 9/1971 | Smith |
| 3,649,469 A | 3/1972 | MacBeth |
| 3,657,879 A | 4/1972 | Ewbank |
| 3,677,239 A | 7/1972 | Elkins |
| 3,693,347 A | 9/1972 | Kydd |
| 3,702,110 A | 11/1972 | Hoffman |
| 3,703,807 A | 11/1972 | Rice |
| 3,731,485 A | 5/1973 | Rudolph |
| 3,736,745 A | 6/1973 | Karig |
| 3,738,792 A | 6/1973 | Peng |
| 3,747,336 A | 7/1973 | Dibelius |
| 3,751,906 A | 8/1973 | Leas |
| 3,772,881 A | 11/1973 | Lange |
| 3,779,212 A | 12/1973 | Wagner |
| 3,792,690 A | 2/1974 | Cooper |
| 3,804,579 A | 4/1974 | Wilhelm |
| 3,807,373 A | 4/1974 | Chen |
| 3,826,080 A | 7/1974 | DeCorso |
| 3,831,373 A | 8/1974 | Flynt |
| 3,850,569 A | 11/1974 | Alquist |
| 3,854,283 A | 12/1974 | Stirling |
| 3,862,624 A | 1/1975 | Underwood |
| 3,862,819 A | 1/1975 | Wentworth |
| 3,928,961 A | 12/1975 | Pfefferle |
| 3,972,180 A | 8/1976 | Van Gelder |
| 3,978,661 A | 9/1976 | Cheng |
| 3,980,064 A | 9/1976 | Ariga |
| 3,982,878 A | 9/1976 | Yamane |
| 4,063,414 A | 12/1977 | Sata |
| 4,118,925 A | 10/1978 | Sperry |
| 4,133,171 A | 1/1979 | Earnest |
| 4,148,185 A | 4/1979 | Somers |
| 4,193,259 A | 3/1980 | Muenger |
| 4,194,890 A | 3/1980 | McCombs |
| 4,199,327 A | 4/1980 | Hempill |
| 4,224,299 A | 9/1980 | Barber |
| 4,224,991 A | 9/1980 | Sowa |
| 4,249,371 A | 2/1981 | Romeyke |
| 4,271,664 A | 6/1981 | Earnest |
| 4,273,743 A | 6/1981 | Barber |
| 4,297,841 A | 11/1981 | Cheng |
| 4,313,300 A | 2/1982 | Wilkes |
| 4,337,618 A | 7/1982 | Hughes |
| 4,377,067 A | 3/1983 | Sternfeld |
| 4,425,755 A | 1/1984 | Hughes |
| 4,426,842 A | 1/1984 | Collet |
| 4,434,613 A | 3/1984 | Stahl |
| 4,456,069 A | 6/1984 | Vigneri |
| 4,465,023 A | 8/1984 | Wagner |
| 4,498,289 A | 2/1985 | Osgerby |
| 4,499,721 A | 2/1985 | Cheng |
| 4,509,324 A | 4/1985 | Urbach |
| 4,519,769 A | 5/1985 | Tanaka |
| 4,528,811 A | 7/1985 | Stahl |
| 4,533,314 A | 8/1985 | Herberling |
| 4,549,397 A | 10/1985 | Cheng |
| 4,622,007 A | 11/1986 | Gitman |
| 4,631,914 A | 12/1986 | Hines |
| 4,657,009 A | 4/1987 | Zen |
| 4,674,463 A | 6/1987 | Duckworth |
| 4,680,927 A | 7/1987 | Cheng |
| 4,716,737 A | 1/1988 | Mandrin |
| 4,731,989 A | 3/1988 | Furuya |
| 4,765,143 A | 8/1988 | Crawford |
| 4,825,650 A | 5/1989 | Hosford |
| 4,841,721 A | 6/1989 | Patton |
| 4,845,940 A | 7/1989 | Beer |
| 4,884,529 A | 12/1989 | Byrnes |
| 4,899,537 A | 2/1990 | Cheng |
| 4,910,008 A | 3/1990 | Prudhon |
| 4,916,904 A | 4/1990 | Ramsaier |
| 4,928,478 A | 5/1990 | Maslak |
| 4,942,734 A | 7/1990 | Markbreiter |
| 4,948,055 A | 8/1990 | Belcher |
| 4,982,568 A | 1/1991 | Kalina |
| 4,987,735 A | 1/1991 | DeLong |
| 5,050,375 A | 9/1991 | Dickinson |
| 5,055,030 A | 10/1991 | Schirmer |
| 5,069,031 A | 12/1991 | Shekleton |
| 5,088,450 A | 2/1992 | Sternfeld |
| 5,103,630 A | 4/1992 | Correa |
| 5,131,225 A | 7/1992 | Roettger |
| 5,175,994 A | 1/1993 | Fox |
| 5,175,995 A | 1/1993 | Pak |
| 5,247,791 A | 9/1993 | Pak |
| 5,265,410 A | 11/1993 | Hisatome |
| 5,285,628 A | 2/1994 | Korenberg |
| 5,329,758 A | 7/1994 | Urbach |
| 5,353,589 A | 10/1994 | Althaus |
| 5,363,642 A | 11/1994 | Frutschi |

| | | |
|---|---|---|
| 5,413,879 A * | 5/1995 | Domeracki et al. ............ 429/30 |
| 5,417,053 A | 5/1995 | Uji |
| RE35,061 E | 10/1995 | Correa |
| 5,479,781 A | 1/1996 | Fric |
| 5,482,791 A * | 1/1996 | Shingai et al. ................. 429/23 |
| 5,490,377 A | 2/1996 | Janes |
| 5,491,969 A | 2/1996 | Cohn |
| 5,511,971 A | 4/1996 | Benz |
| 5,535,584 A | 7/1996 | Janes |
| 5,541,014 A * | 7/1996 | Micheli et al. ............... 429/19 |
| 5,557,936 A | 9/1996 | Drnevich |
| 5,572,861 A | 11/1996 | Shao |
| 5,581,997 A | 12/1996 | Janes |
| 5,590,518 A | 1/1997 | Janes |
| 5,617,719 A | 4/1997 | Ginter |
| 5,628,184 A | 5/1997 | Santos |
| 5,636,980 A | 6/1997 | Young |
| 5,678,408 A | 10/1997 | Janes |
| 5,678,647 A * | 10/1997 | Wolfe et al. ............... 180/65.3 |
| 5,679,134 A | 10/1997 | Brugerolle |
| 5,687,560 A | 11/1997 | Janes |
| 5,693,201 A | 12/1997 | Hsu |
| 5,709,077 A | 1/1998 | Beichel |
| 5,715,673 A | 2/1998 | Beichel |
| 5,724,805 A | 3/1998 | Golomb |
| 5,761,896 A | 6/1998 | Dowdy |
| 5,802,840 A | 9/1998 | Wolf |
| 5,852,925 A | 12/1998 | Prasad |
| 5,956,937 A | 9/1999 | Beichel |
| 5,968,680 A * | 10/1999 | Wolfe et al. .................. 429/13 |
| 5,970,702 A | 10/1999 | Beichel |
| 5,976,332 A | 11/1999 | Hsu |
| 5,997,595 A | 12/1999 | Yokohama |
| 6,196,000 B1 | 3/2001 | Fassbender |
| 6,607,854 B1 * | 8/2003 | Rehg et al. .................... 429/13 |

OTHER PUBLICATIONS

Reese, R. et al.; A Proposed Hydrogen–Oxygen Fueled Steam Cycle for the Propulsion of Deep Submersibles; 1971; Massachusetts.

Lotker, M.; Hydrogen for the Electric Utilities—Long Range Possibilities; 1974; Hartford, Connecticut.

Lucci, A. et al.; Title Unknown (IECEC '75 Record); 1975; Canoga Park, California.

De Biasi, V.; A Look Into Real Payoffs for Combined Cycle Conversions; Gas Turbine World; 1984; pp. 17, 18, 20, 22.

Pak, P. S. et al.; Closed Dual Fluid Gas Turbine Power Plant Without Emission of CO2 into the Atmosphere; IFAC/IFOR IAEE Symposium; 1989; Pergamon Press; Tokyo Japan.

Bolland, O. et al.; New Concepts for Natural Gas Fired Power Plants which Simplify the Recovery of Carbon Dioxide; Energy Convers. Mgmt.; 1992; pp. 467–475; vol. 33, No. 5–8; Pergamon Press Ltd. ; Great Britain.

Hendriks, C.A. et al.; Carbon Dioxide Recovery Using a Dual Gas Turbine IGCC Plant; Energy Convers. Mgmt.; 1992; pp. 387–396; vol. 33, No. 5–8; Pergamon Press Ltd.; Great Britain.

Mercea, P. V. et al.; Oxygen Separation from Air by a Combined Pressure Swing Adsorption and Continuous Membrane Column Process; Journal of Membrane Science; 1994; pp. 131–144; Cincinnati, Ohio.

Bolland, O. et al.; Comparative Evaluation of Combined Cycles and Gas Turbine Systems with Water Injection, Steam Injection, and Recuperation; Transactions of the ASME; Jan. 1995; pp. 138–140, 142–145; vol. 117.

The NOx Report; Feb. 20, 1995; vol. 1, No. 1.

Alkam, M. K. et al.; Methanol and Hydrogen Oxidation Kinetics in Water at Supercritical States; 1995; The University of Iowa; Iowa City, Iowa.

Rice, I. G.; Steam–Injected Gas Turbine Analysis: Steam Rates; Journal of Engineering for Gas Turbines and Power; Apr. 1995; pp. 347–353; vol. 117.

Kolp, D. A. et al.; Advantages of Air Conditioning and Supercharging an LM6000 Gas Turbine Inlet; Journal of Engineering for Gas Turbines and Power; Jul. 1995; vol. 117.

EPA Proposes Across–the–Board Phase II NOx Limitations; Air Pollution Regulatory Analysis Service; Jan. 19, 1996; Article No. 96–2.

Agazzani, A. et al.; An Assessment of the Performance of Closed Cycles with and without Heat Rejection at Cryogenic Temperatures; International Gas Turbine and Aeroengine Congress & Exhibition; Jun. 10–13, 1996; Birmingham, UK.

Facchini, B. et al.; Semi–Closed Gas Turbine/Combined Cycle with Water Recovery and Extensive Exhaust Gas Recirculation; International Gas Turbine and Aeroengine Congress & Exhibition; Jun. 10–13, 1996; Birmingham, UK.

Nakhamkin, M. et al.; The Cascaded Humidified Advanced Turbine (CHAT); Journal of Engineering for Gas Turbines and Power; Jul. 1996; pp. 565–571; vol. 118.

Rice, I. G.; Split Stream Boilers for High–Temperature/ High–Pressure Topping Steam Turbine Combined Cycles; Journal of Engineering for Gas Turbines and Power; Apr. 1997; pp. 385–394; vol. 119.

Ulizar, I. et al.; A Semiclosed–Cycle Gas Turbine With Carbon Dioxide–Argon as Working Fluid; Journal of Engineering for Gas Turbines and Power; Jul. 1997; pp. 612–616; vol. 19.

Wilson, D. G. et al.; The Design of High–Efficiency Turbomachinery and Gas Turbines, Second Editioin; 1998; pp. 146–161; Prentice Hall; Upper Saddle River, New Jersey.

Bannister, R. L. et al.; Development of a Hydrogen–Fueled Combustion Turbine Cycle for Power Generation; Transactions of the ASME; Apr. 1998; pp. 276–283; vol. 120.

Mathieu, P. et al.; Zero–Emission MATIANT Cycle; Transactions of the ASME; Jan. 1999; pp. 116–120; vol. 121.

Norwegian Idea for CO2–Free Power Generation; Greenhouse Issues; Mar. 1999.

Turkenburg, W. C. et al.; Fossil Fuels in a Sustainable Energy Supply: The Significance of CO2 Removal; A Memorandum at the Request of the Ministry of Economic Affairs the Hague; Jun. 1999; pp. 1–26; Utrecht.

Bilger, R. W.; Zero Release Combustion Technologies and the Oxygen Economy; Fifth Int'l Conference on Technologies and Combustion for a Clean Environment; Jul. 1999; Lisbon, Portugal.

Bilger, R. W.; The Future for Energy from Combustion of Fossil Fuels; Fifth Int'l Conference on Technologies and Combustion for a Clean Environment; Jul. 1999; Lisbon, Portugal.

Herzog, H. et al.; Capturing Greenhouse Gases; Scientific American; Feb. 2000; pp. 72–79.

Anderson, R. E. et al.; A Unique Process for Production of Environmentally Clean Electric Power Using Fossil Fuels; 8th International Symposium on Transport Phenomena and Dynamics of Rotating Machinery; Mar. 2000; pp. 1–6; Honolulu, Hawaii.

Ali, S. A. et al.; The Hybrid Cycle: Integration of Turbomachinery with a Fuel Cell; Internal Gas Turbine & Aeroengine Congress & Exhibition; Jun. 1999; pp. 1–4; Indianapolis, Indiana.

Massardo, A. F. et al.; Internal Reforming Solid Oxide Fuel Cell–Gas Turbine Combined Cycles (IRSOFC–GT): Part A–Cell Model and Cycle Thermodynamic Analysis; Journal of Engineering for Gas Turbines and Power; Jan. 2002; pp. 27–35; vol. 122.

Campanari, S.; Full Load and Part–Load Performance Prediction for Integrated SOFC and Microturbine Systems; Journal of Engineering for Gas Turbines and Power; Apr. 2000; pp. 239–246; vol. 122.

Chiesa, P. et al.; Natural Gas Fired Combined Cycles with Low CO2 Emissions; Journal of Engineering for Gas Turbines and Power; Jul. 2000; pp. 429–436; vol. 122.

Hendriks, C. A. et al.; Costs of Carbon Dioxide Removal by Underground Storage; 5th International Conference on Greenhouse Gas Control Technologies; Aug. 2000; Australia.

Hustad, C. W.; Review Over Recent Norwegian Studies Regarding Cost of Low CO2–Emission Power Plant Technology; 5th International Conference on Greenhouse Gas Control Technology; Aug. 2000; Australia.

Reinkenhof, J. et al.; Steam Generation with Modified H2/O2—Rocket Engines; unknown date.

Sternfeld, H.; A Hydrogen/Oxygen Steam Generator for the Peak–Load Management of Steam Power Plants; unknown date.

Yantovskii, E. I.; The Thermodynamics of Fuel–Fired Power Plants without Exhaust Gases; World Clean Energy Conference; Nov. 1991; Geneva.

Yantovskii, E. I.; Computer Exergonomics of Power Plants without Exhaust Gases; Energy Convers. Mgmt.; 1992; pp. 405–412; vol. 33, No. 5–8; Pergamon Press Ltd.; Great Britain.

Yantovskii, E. I.; A Zero Emission Combustion Power Plant for Enhanced Oil Recovery; Energy; 1995; pp. 823–828; vol. 20, No. 8.

* cited by examiner

COMBINED FUEL CELL AND FUEL COMBUSTION POWER GENERATION SYSTEMS

CROSS-REFERENCE TO RELATED APPLICATIONS

This application claims benefit under Tile 35, United States Code §119(e) of U.S. Provisional Application Nos. 60/293,885, 60/293,886, 60/293,887 and 60/293,895 filed on May 24, 2001. This application also incorporates by reference the entire contents of U.S. Pat. Nos. 5,447,555, 5,611,219, 5,709,077, 5,956,937, 6,170,264, 6,206,684, 6,247,316 and U.S. patent application Ser. Nos. 09/855,223, U.S. Pat. No. 6,688,970, Ser. No. 09/855,224, 09/855,237, U.S. Pat. No. 6,637,183 and Ser. No. 09/178,364.

FIELD OF THE INVENTION

The following invention relates to power plant systems which generate power by releasing energy by reaction of a fuel with an oxidizer. More particularly, this invention relates to power systems which both react oxygen with a hydrogen containing fuel within a fuel cell and combust oxygen with a hydrogen containing fuel in a combustor to convert chemical energy stored in the fuel and the oxidizer into electrical and/or mechanical power.

BACKGROUND OF THE INVENTION

Fundamental to all chemical reactions, which react two or more reactants together to produce products, is the release of energy (in exothermic reactions) or the absorption of energy (in endothermic reactions) associated with a particular chemical reaction. By properly controlling chemical reactions of an exothermic variety, energy can be released and converted into useful electrical or mechanical power.

One common form of exothermic chemical reaction is a combustion reaction. In a combustion reaction, a fuel is reacted with an oxidizer to produce products of combustion. Fuel has energy stored in the bonds between the atoms comprising the fuel molecule. The oxidizer (often oxygen) readily reacts with the fuel molecules to form products of combustion which have lower bond energies, such that energy is released by this reaction. This energy is typically in the form of increased temperature of the reaction products and also can result in increased pressure and/or volume of the combustion products, depending on conditions surrounding the location where the reaction occurs (i.e. within a cylinder of an internal combustion engine or upstream of turbine blades in a gas turbine). The combustion reaction energy release can be harnessed, utilizing known engine design techniques, to produce mechanical power. With an appropriate electrical generator, this mechanical power can be converted into electrical power for transmission or other use.

A separate form of chemical reaction which similarly can harness the exothermic reaction energy produced by reacting a fuel with an oxidizer is that implemented by fuel cell technology. With fuel cells, the fuel and oxygen mixture is not ignited. Rather, the fuel and oxidizer are merely allowed to react together in the presence of the fuel cell device itself. Electrical power is generated by the fuel cell device as the fuel with the oxidizer react to produce the fuel cell products and generate electric power simultaneously. Most typically, the fuel cell utilizes hydrogen as the fuel and oxygen as the oxidizer with the fuel cells producing water as a product of the fuel cell reaction. Some fuel cells are known which utilize other fuels, such as methane ($CH_4$).

While combustion based power systems and fuel cell based power systems are well known in the art, their development in the prior art has been limited to primarily their advancement independent of each other.

SUMMARY OF THE INVENTION

With this invention, the similarities in the fuels, oxidizers and products of both fuel cell reactions and combustion reactions are synergistically and advantageously integrated together to provide a power generation system including both fuel cell reactors and combustion reactors, and expanders to produce power. With the system of this invention fuel from a source of fuel and oxygen from a source of oxygen are reacted together in a fuel cell to produce fuel cell products. The fuel cell also outputs electric power while reacting the fuel with the oxygen therein. These fuel cell products are discharged from the fuel cell, either alone or with non-reacted excess fuel and/or oxygen, with at least a portion of these fluids discharged from the fuel cell directed to a combustor. The combustor combusts fuel with oxygen adjacent the fluids discharged from the fuel cell to produce elevated temperature and elevated pressure products of combustion. These products of combustion are exhausted along with the fluids discharged from the fuel cell together out of the exhaust of the combustor. The fuel cell products and combustion products are then routed through an expander where the products of combustion and the fuel cell products are together expanded and power extracted. Numerous refinements and enhancements to this basic system are disclosed herein to adapt this basic system to the particular needs of a given case.

DESCRIPTION OF THE PREFERRED EMBODIMENT

Figure 1:
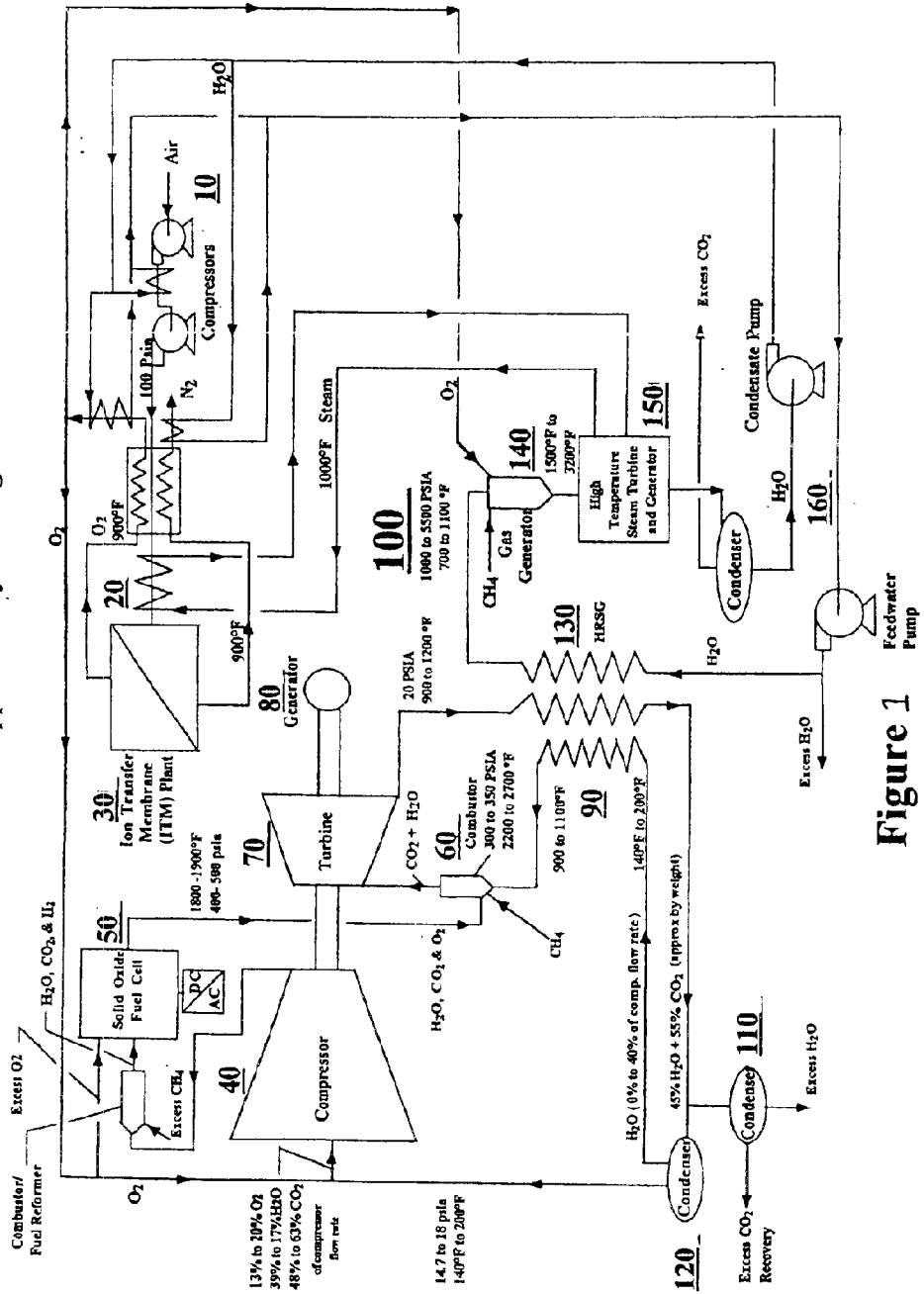
FIG. 1 is a schematic illustrating the flow of reactants and products flowing through the system and the various components which function together to form one system according to this invention, with the system particularly configured in the form of a semi-closed combined cycle power plant including both a fuel cell and a combustor and featuring an ion transfer membrane air separation unit and supplementary heating.

FIG. 1 illustrates the concept of this invention with a non-polluting efficient electrical energy power plant 100, comprising an air induction subsystem 10, air preheating subsystem 20, an ion membrane air separation subsystem 30, a gas compression subsystem 40, a fuel cell subsystem 50, a combustor subsystem 60, a gas turbine drive subsystem 70, an electric energy generation subsystem 80, a heat recovery subsystem 90, a H2O/CO2 separation subsystem 110, a gas separation/water management subsystem 120, a heat recovery steam generator subsystem 130, a gas generator subsystem 140, a steam turbine/generator subsystem 150, and a condenser/water management subsystem 160. Many of these subsystems are described in detail in either copending U.S. patent application Ser. Nos. 09/855,223, 09/855,224 and 09/855,237 or in U.S. Pat. Nos. 6,170,264 and 6,247,316; each of these references hereby incorporated by reference.

The air induction subsystem 10 feeds and controls the air supply to generate the oxygen needed by the plant 100. The air is heated to approximately 900° F. with low energy steam/CO2 mixture, from steam of subsystem 130, in the heat exchanger of subsystem 20. The warm air then enters the ion membrane plant 30 where oxygen/nitrogen separation takes place. The ion membrane plant 30 can be configured such as described in U.S. Pat. No. 5,447,555, incorporated herein by reference. The nitrogen is optionally collected, cooled, and sold as a byproduct or discharged back to the atmosphere. The preferably nearly pure oxygen (but optionally at least oxygen enriched air and beneficially a majority oxygen) is collected, cooled and directed to the gas compression subsystem 40. The compressed gas exiting subsystem 40 is then directed to the fuel cell subsystem 50 where electricity is generated by the chemical reaction of oxygen with the hydrogen containing fuel. The hydrogen is optionally produced according to this embodiment in a gas generator combusting excess CH4 with O2 to produce H2, CO2 and possible H2O and CO. The fuel cell can be of the solid oxide fuel cell variety or any other known or not-yet-known fuel cell. The gas generator and other subsystems can be configured as described in U.S. Pat. Nos. 6,206,684; 6,170,264; or 5,956,937, each of which is incorporated herein by reference.

The fuel cell discharge fluids are then directed to combustor subsystem 60. These discharge fluids include fuel cell products and optionally excess fuel and/or oxygen. In the combustor subsystem 60, these discharge fluids, fuel and optionally recirculating heated water (steam) from subsystem 90 are mixed and combust at preferably a near stoichiometric mixture ratio to generate the drive gas of approximately 55% CO2 and 45% H2O by weight, in this example of FIG. 1, for the gas turbine subsystem 70. The turbine of subsystem 70 provides one form of expander to drive the generator of subsystem 80 to produce electricity.

The gas exiting the turbine or other expander from subsystem 70 then optionally enters the heat recovery steam generation subsystem 90 where recirculating water is heated for injection into the gas generation subsystem 60 and for preheating the air in subsystem 20 or for other use at locations upstream or downstream of the expander. The turbine exhaust fluids of preferably approximately 55% CO2 and 45% H2O by weight exiting the heat recovery subsystem 90 are directed to the condensers of subsystem 110 and 120. The excess gas of 55% CO2 and 45% H2O is cooled upon entry into the condenser of subsystem 110 where the steam condenses into liquid water and separates from the still gaseous CO2. This condenser thus provides one form of separator to separate a portion of the H2O from the CO2. The CO2 is optionally pumped from the condenser of subsystem 110 and processed for sale as a byproduct, discharged to the atmosphere or prepared for sequestration into underground formations, such as depleted oil wells for enhanced oil recovery or mere CO2 disposal, or deep ocean disposal sites.

The excess water from subsystem 110 can be used as makeup water for other subsystems. The remainder of the gas from subsystem 90 optionally enters the condenser of subsystem 120 where a portion of the steam is condensed and the remaining portion of steam and CO2 is returned to the compressor of subsystem 40 where it is optionally mixed with oxygen coming from subsystem 30. The condensed water from subsystem 120 is directed to the heat recovery subsystem 90 where heat from the turbine exhaust of subsystem 70 is recovered and the recirculated heated water (steam) is injected into the gas generation subsystem 60.

Exhaust gases from the turbine of subsystem 60 are also used to maximize every efficiency of the power plant 100. Such use could be to generate steam or other high temperature fluids for use in industrial processes (i.e. co-generation) or to drive a standard Rankine cycle steam turbine. Most preferably, where efficiency is to be optimized according to this embodiment, the exhaust gas heat is used to heat the steam in the heat recovery steam generator (HRSG) of subsystem 130. The gas generator of subsystem 140 boosts the steam temperature to its maximum value and drives the steam turbine and generator of subsystem 150. The exhaust steam from subsystem 150 is condensed and recirculated by the condensate and feed water pumps of the water management system 160. The condensed water from the water management system 160 is also used to cool the oxygen and nitrogen gases, generated by the Ion Transfer Membranes (ITM) of the Air Separation Unit (ASU) of subsystem 30, to near ambient temperatures. Specific temperatures, pressures and other quantitative rates of a typical system such as that of FIG. 1 are shown in FIG. 1 to illustrate this system and not to limit it to such values in any way.

Figure 2:
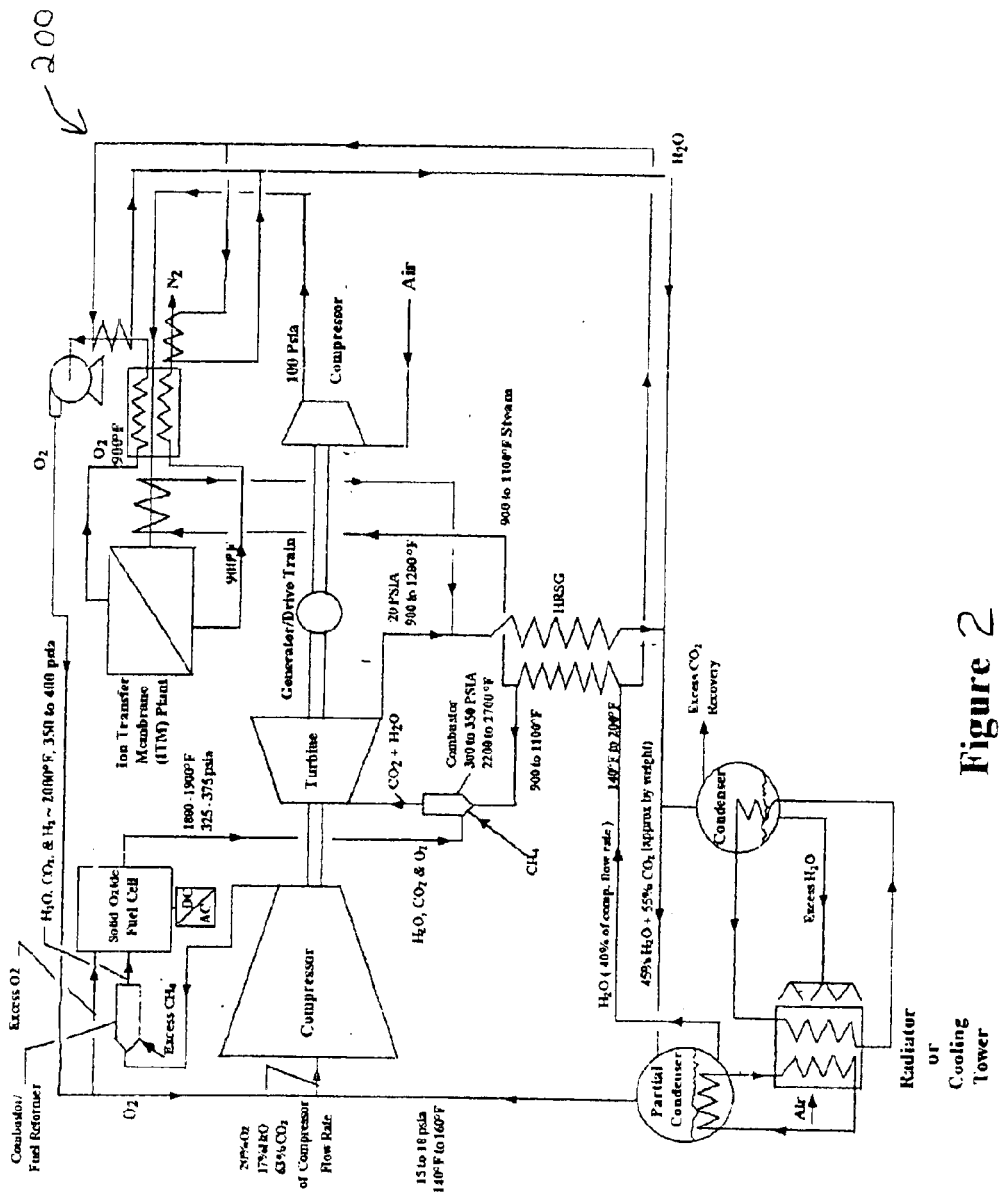
FIG. 2 is a schematic illustrating the flow of reactants and products flowing through the system and the various components which function together to form one system according to this invention, with the system particularly configured as a semi-closed steam injection cycle including a fuel cell and a combustor and featuring an ion transfer membrane air separation unit and configured for use to produce either stationary or mobile power.

FIG. 2 depicts an alternative high efficiency hybrid power system 200 such as for automotive or stationary application. The system 200 combines fuel cells with a semi-closed STIG Brayton cycle such as that disclosed in copending U.S. patent application Ser. No. 09/855,237. This cycle eliminates the steam turbine of the bottoming cycle and achieves high cycle efficiencies with the fuel cell/fuel combustor hybrid combination.

The system 200 of FIG. 2 is similar to the system 100 of FIG. 1 except as specifically described herein. The air entering the ion transfer membrane air separation unit of this embodiment is routed through compressors driven by the generator/drive train 80 (FIG. 1) rather than through a separate compressor 10 (FIG. 1). The system 200 also differs from the system 100 of FIG. 1 in that preferably a greater portion of water downstream of the turbine is recycled back to the combustor 60 (FIG. 1) rather than back through the compressor 40 (FIG. 1). Also, the heat recovery steam generator 130, gas generator 140, high temperature steam turbine and generator 150 and related portions of the system 100 of FIG. 1 are not included in the system 200 of FIG. 2. Also, the system 200 of FIG. 2 includes a condenser and a partial condenser for separation of products including H2O and CO2 with the optional provision of a radiator or cooling tower to cool gases within the condensers and to increase efficiency in condensing the water from the carbon dioxide within these condensers. Other specific temperature, pressure and mass flow rate details of a typical system 200 shown in FIG. 2 are provided thereon to illustrate the particular details of a typical implementation according to the system 200, illustrating one variation on this invention.

Figure 3:
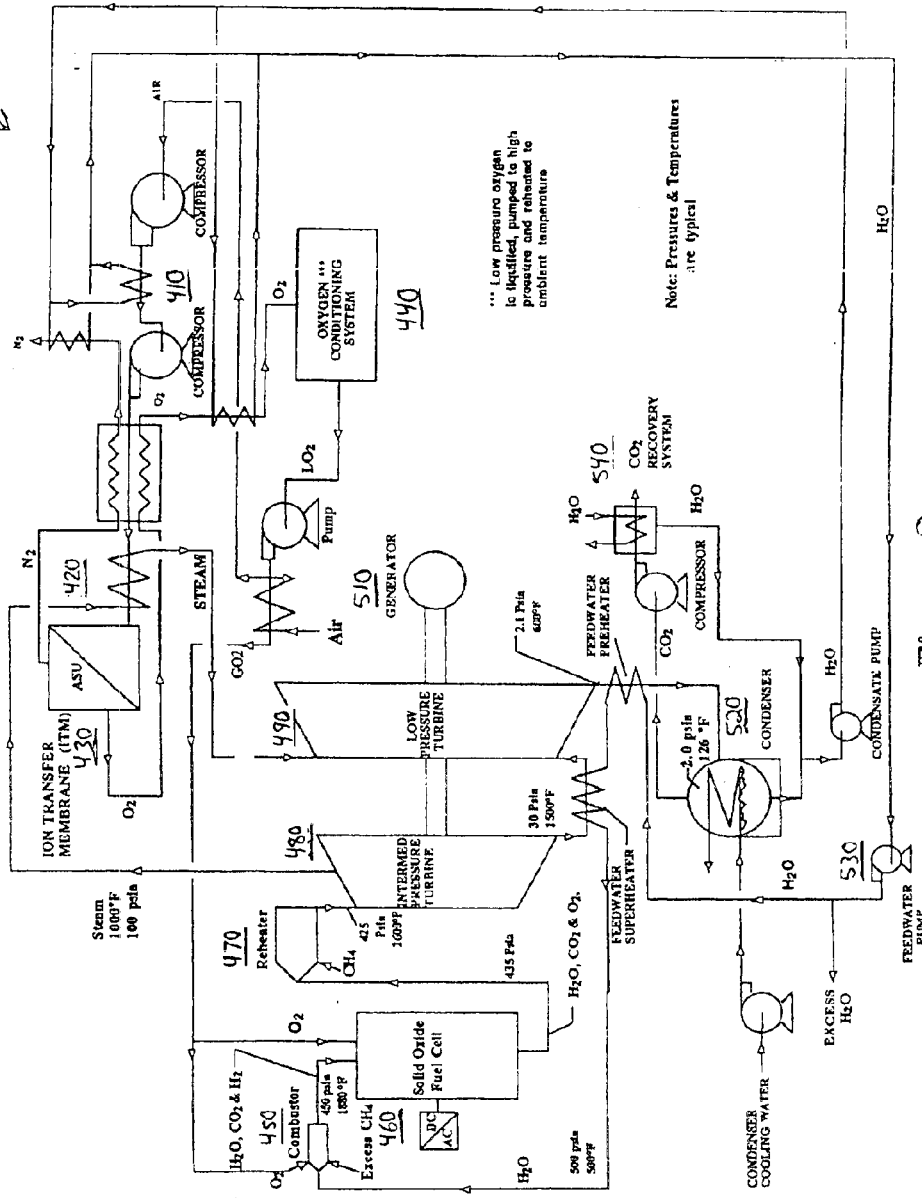
FIG. 3 is a schematic illustrating the flow of reactants and products flowing through the system and the various components which function together to form one system according to this invention, with the system particularly configured as a Rankine cycle power plant including a fuel cell and combustors and featuring an ion transfer membrane air separation unit.

FIG. 3 depicts another alternative system 400 according to this invention. In this alternative a potentially non-polluting, efficient electrical energy power plant system 400 is shown. The system 400 comprises an air induction subsystem 410, air preheating subsystem 420, an ion membrane air separation subsystem 430, an oxygen conditioning subsystem 440, a combustor gas generation subsystem 450, a fuel cell subsystem 460, a gas reheater subsystem 470, an intermediate steam turbine drive subsystem 480, a low pressure steam turbine drive subsystem 490, an electric energy generation subsystem 510, an exhaust management subsystem 520, a regenerated water management subsystem 530, and a carbon dioxide removal/conditioning subsystem 540. The features of this system 400 are specifically set forth as an illustration of a typical arrangement according to this invention. As with other systems 100 and 200 described above, similar alternatives can also optionally be utilized.

The air induction subsystem 410 feeds and controls the air supply to generate the oxygen needed by the system 400. The air is heated to approximately 900° F. with low energy steam, from an appropriate place in the system 400, such as the steam turbine drive subsystem 480, in the heat exchanger of subsystem 420. The warm air then enters the ion membrane plant 430 where oxygen/nitrogen separation takes place. The ion transfer membrane plant 430 can be configured such as described in U.S. Pat. No. 5,447,555, incorporated herein by reference.

The nitrogen is collected, cooled, and sold as a byproduct or discharged back to the atmosphere. The oxygen is collected, cooled and directed to the oxygen conditioning subsystem where the oxygen is either: (1) cooled, liquefied, pumped to high pressures and then heated to a gas or; (2) pumped to high pressure in the gaseous state and directed to the combustor gas generation subsystem 450. The method for achieving high pressure oxygen will depend on safety issues and/or customer preference and other optimization requirements.

Fuel, such as natural gas (or syngas from biomass sources or gasified coal, or other hydrocarbon fuel), and water are also optionally injected into the combustor gas generation subsystem 450 where combustion takes place to generate the heated combustion products of approximately 95% steam and 5% CO2 (by volume) in one typical implementation of this system 400. Water can be added to the gas generator 450 to control the temperature of combustion if necessary. The gas generator and other components of the system 400 can be configured such as described in U.S. Pat. Nos. 6,206,684; 6,170,264; and 5,956,937, each incorporated herein by reference.

In this system 400, excess fuel can be added to a mixer downstream of the combustor or at the combustor 450. The excess fuel, typically methane (CH4) or natural gas, reforms into CO2 and hydrogen (and optionally also CO and H2O) to supply fuel cell subsystem 460. Alternatively, the fuel can be supplied rather than generated within the system 400.

Electricity is generated by subsystem 460 by means of the fuel cell chemical reaction of oxygen and hydrogen. The gas, preferably with excess oxygen, discharges from the fuel cell subsystem 460, then enters the reheater combustor of subsystem 470 where additional fuel and optionally oxygen is added to heat the drive gas to design turbine inlet temperatures prior to entering the turbines, subsystem 480 and subsystem 490, which in turn drive the generator, subsystem 510. The reheater 470 can also use the oxygen to combust the CO and any excess H2 not used in the fuel cell 40 into CO2 and H2O.

The exhaust gases from subsystem 490 can then enter the condenser exhaust management subsystem 520 if desired to maximize control of emission of CO2, where the steam condenses and the CO2 remains as a non-condensible gas. The condensed water from subsystem 520 is pumped to moderate pressure and used to cool down the oxygen and nitrogen discharge gases from the air separation plant prior to entering the feed water pump subsystem 530. In this embodiment, the water is pumped to high pressure and recirculated back to the gas generation subsystem 450 and the fuel cell subsystem 460. The CO2 is pumped from the exhaust management subsystem 520 by means of the carbon dioxide removal/conditioning subsystem 540 and processed for sale as a byproduct, discharged to the atmosphere or prepared for sequestration into underground formations (such as oil wells appropriate for enhanced oil recovery, or suitable to sequester the CO2 therein) or deep ocean disposal sites.

Figure 4:
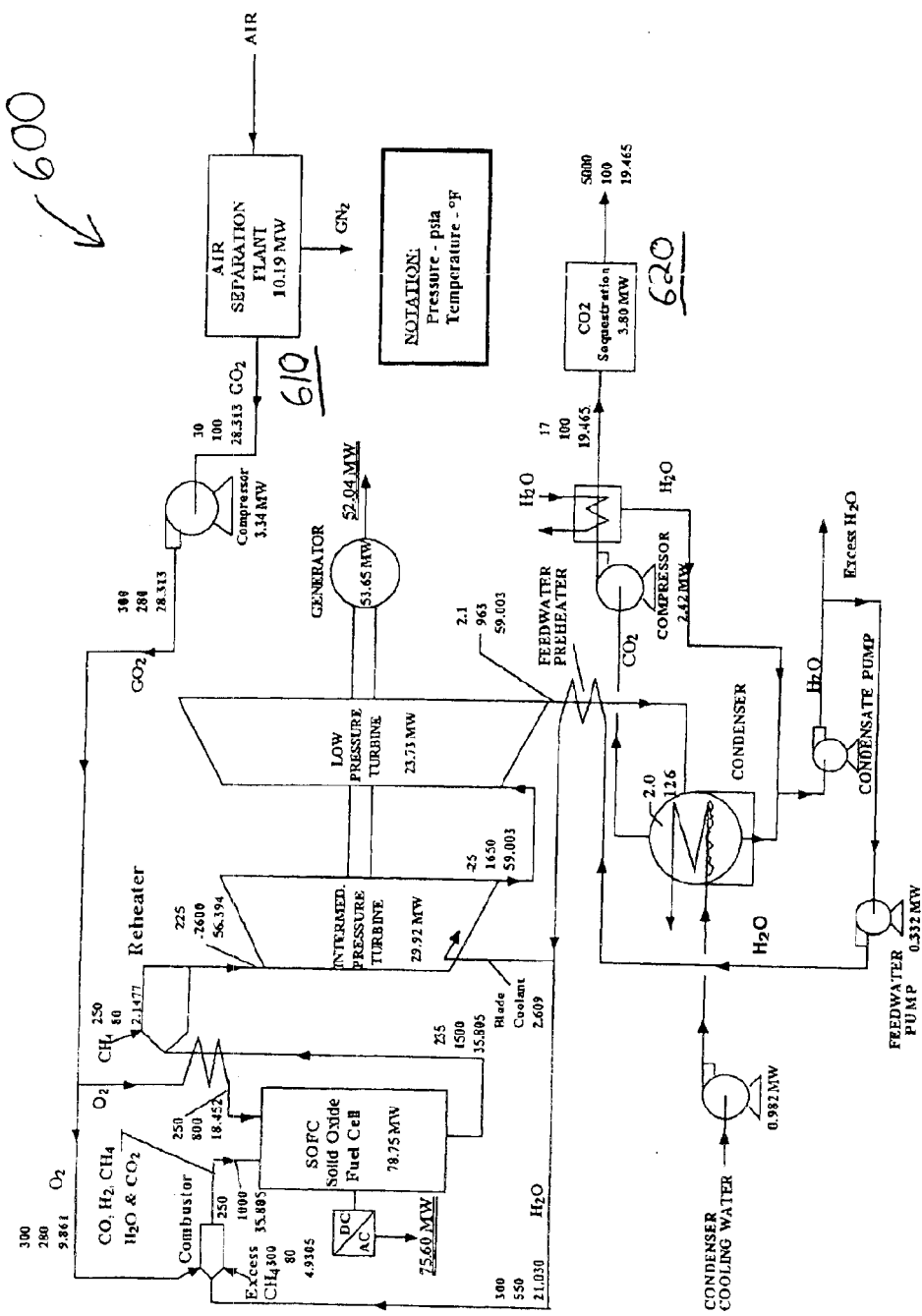
FIG. 4 is a schematic illustrating the flow of reactants and products flowing through the system and the various components which function together to form one system according to this invention with this variation of the system configured for either a cryogenic air separation plant or an ion transfer membrane air separation plant or other air separation plant technology and with particular pressures, temperatures and mass flow rates of the reactants and products, as well as power output quantities of a typical sizing of the system depicted thereon.

FIG. 4 shows a schematic of a hybrid fuel cell and fuel combustion power system 600 according to another alternative form of this invention. Much of this power system 600 configuration is composed of components described in detail in U.S. Pat. Nos. 6,206,684; 6,170,264; and 5,956,937, each incorporated herein by reference. With this embodiment of FIG. 4, a fuel cell, such as a solid oxide fuel cell (SOFC) has been integrated into this power generation system. Other types of fuel cells could similarly be integrated into this system with this configuration particularly beneficial for fuel cells which require that oxygen and hydrogen (or other hydrogen containing fuels) to have an elevated temperature.

The system 600 of FIG. 4 is similar to the system 400 of FIG. 3 except that the air separation plant 610 can be either of a cryogenic variety or an ion transfer membrane variety. An oxygen preheater is thus provided if necessary upstream of the fuel cell. Equipment to sequester the CO2 produced by the system 600 is shown at 620. Additionally, typical values of temperature, pressure and flow rate are depicted, mostly as an example, for one form of this system 600. With these values, the system 400 produces net power output of 109 MW without CO2 sequestration, 105 MW with CO2 sequestration, and exhibits 68% thermal efficiency without CO2 sequestration and 65% with CO2 sequestration; when the system 600 receives 161 MW of thermal power in the fuel (lower heating value of 21,518 Btu/Lb).

The system 600 of FIG. 4 utilizes oxygen as the oxidizer both within the gas generator and reheater which power the turbines and oxygen to power the fuel cell. This oxygen is preferably provided by an air separation plant. If the air separation plant is of a cryogenic variety (such as that disclosed in U.S. Pat. No. 5,611,219, incorporated herein by reference), cold exhaust products, such as low temperature nitrogen, can be used to cool incoming air and/or to cool carbon dioxide before carbon dioxide sequestration into a disposal site such as a depleted oil well for enhanced oil recovery.

The oxygen exiting the air separation plant can be split with some oxygen feeding the gas generator and reheater. Other oxygen is routed to the fuel cell. Optionally, the oxygen can be routed through a first component without reaction before passing onto a second component for reaction. When the air separation plant is a cryogenic air separation plant, the oxygen is typically preheated before entering the fuel cell. Preferably, such preheating occurs by exchange of heat from the exhaust combustion products (typically water and carbon dioxide) exiting the high pressure turbine. Similarly, heat from the exhaust of the high pressure turbine can be used to preheat the hydrogen or other hydrocarbon fuel (CH4, syngas, etc.) before entering the fuel cell.

If the air separation plant is based on ion transfer membrane technology (such as that disclosed in U.S. Pat. No. 5,447,555, incorporated herein by reference) the oxygen has an elevated temperature upon exiting the air separation plant. Such already high temperature oxygen can be directed directly to the fuel cell. If additional heating is required, additional heating potentially be provided by heat exchange from the exhaust of the high pressure turbine as discussed above, or otherwise.

The exhaust of the fuel cell including water and carbon dioxide is similar to the products of combustion generated within the gas generator and routed through the high pressure turbine. Thus, the exhaust of the fuel cell including carbon dioxide and water can be added directly to the exhaust of the high pressure turbine. If the fuel cell uses hydrogen fuel, the fuel cell would exhaust only water. This water fuel cell discharge is similarly combinable with the water and carbon dioxide exhaust of the high pressure turbine with a ratio of water to carbon dioxide in the combined exhaust increasing.

This water and carbon dioxide exhaust of the high pressure turbine and exhaust of the fuel cell, combined together, is then routed through an intermediate pressure turbine. Preferably, performance of the intermediate pressure turbine and a low pressure turbine are enhanced by reheating the water and carbon dioxide combined exhaust of the high pressure turbine and the fuel cell. This reheater would have a hydrocarbon fuel such as methane or syngas introduced therein, or optionally hydrogen, and typically additionally oxygen from the air separation plant. Excess oxygen can be generated within the gas generator or the fuel cell so that excess oxygen remains within the exhaust of the high pressure turbine and the exhaust of the fuel cell. Such excess oxygen within this exhaust stream fed to the reheater can reduce or eliminate the need for oxygen being separately routed from the air separation plant directly to the reheater. This concept and the details associated therewith are particularly disclosed in U.S. patent application Ser. No. 09/178,364, incorporated herein by reference.

The reheater boosts the temperature of the exhaust of the high pressure turbine and the fuel cell within the reheater. Additionally, the reheater generates additional products of combustion in the form of carbon dioxide and water (or water only if the fuel is hydrogen). These multiple exhaust streams are all mixed together to produce a single carbon dioxide and water (or water only) exhaust stream exiting the reheater and entering the intermediate pressure turbine. As disclosed in the attached figure, these exhaust products are preferably routed through a low pressure turbine with a second reheater upstream of the low pressure turbine being optional.

Each of the turbines can drive a common generator on a common shaft with or without rotational speed matching. If the exhaust products include both carbon dioxide and water, they can optionally be separated in a condenser. The water can then be preheated and returned to the gas generator with some excess water removed from the system. Any carbon dioxide is typically pressurized for injection into a terrestrial formation such as a depleted oil well or can otherwise be conditioned for later industrial use or release into the atmosphere.

Figure 5:
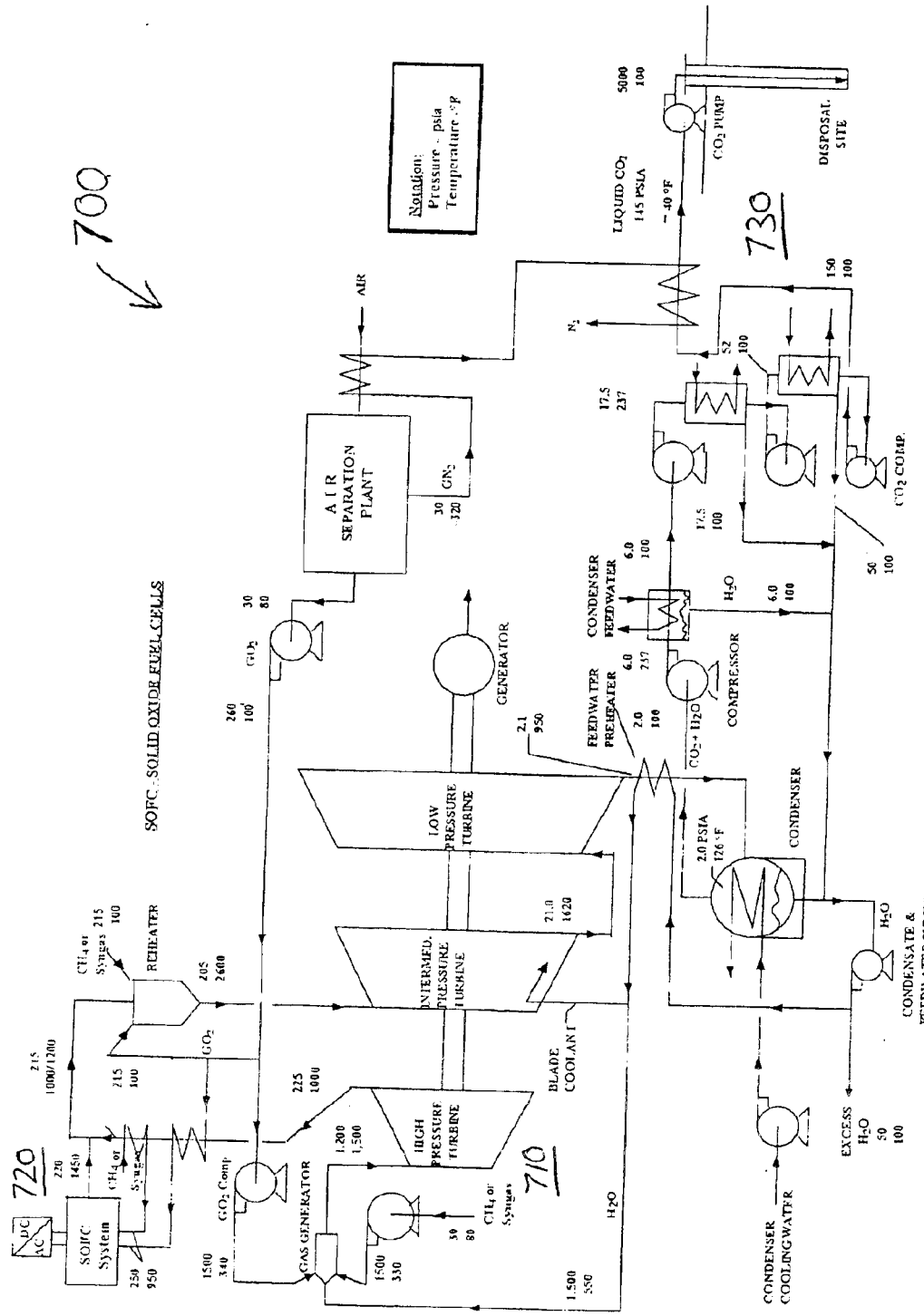
FIG. 5 is a schematic illustrating the flow of reactants and products flowing through the system and the various components which function together to form one system according to this invention with this system particularly configured with a cryogenic air separation plant integrated with a CO2 sequestration system adapted for compression and sequestration of CO2 within a terrestrial formation and with the fuel cell of this system oriented at least partially in parallel with a gas generator and high pressure turbine with both the fuel cell and the gas generator and high pressure turbine directing products on to a common reheater.

FIG. 5 depicts a power system 700 according to another alternative embodiment of this invention which combines a solid oxide fuel cell (SOFC) or other form of fuel cell with steam turbines within a power plant. The general configuration of the power system 700 includes components and interconnections similar to those described in detail in U.S. Pat. Nos. 6,206,684; 6,170,264; and 5,956,937, each incorporated herein by reference. This system 700 is similar in many respects to the system 600 of FIG. 4 and other systems 100, 200, 400 of this invention. Any variations particularly disclosed above with respect to these systems 100, 200, 400, 600 are equally viable as variations to this system 700. Similarly, the variations disclosed in relationship to this system 700 are equally viable as variations to the other systems 100, 200, 400, 600. The system 700 of FIG. 5 most significantly differentiates from the system 600 of FIG. 4 by placing the fuel cell 720 in parallel with a high pressure turbine, rather than replacing the high pressure turbine. Also, additional features of the CO2 sequestration system 730 are depicted.

With the system 700 disclosed in FIG. 5, the fuel cell receives oxygen and hydrogen (or a hydrocarbon fuel such as methane or syngas). The fuel cell can additionally receive other gases which are either bypassed through the fuel cell or enhance the operation of the fuel cell. These gases together include one or more of CO, H2, CH4, H2O and CO2.

The oxygen for the fuel cell preferably, but not necessarily, originates within an air separation plant separating the oxygen from nitrogen and possibly other gases within the air. This air separation plant can be cryogenic such as that described in U.S. Pat. No. 5,611,219, incorporated herein by reference, or can utilize ion transfer membrane air separation technology such as that described in U.S. Pat. No. 5,447,555, incorporated herein by reference, or through use of any other appropriate air separation technology. The oxygen supplied by the air separation plant is compressed to the pressure required by the fuel cell. If necessary, the oxygen supply is preheated before entering the fuel cell. Preheating of the oxygen supply beneficially occurs with a heat exchanger transferring heat from the exhaust of the fuel cell into the oxygen entering the fuel cell. Alternatively, heat exchange with other hot fluids (i.e. the intermediate or low pressure turbine exhausts) could occur to preheat the oxygen.

The fuel entering the fuel cell preferably is provided from the exhaust of the gas generator/combustor. If the combustor receives a stoichiometric ratio of methane and oxygen, essentially only carbon dioxide and water are produced and no fuel is included in the exhaust to power the fuel cell. Hence, the combustor is preferably operated with excess methane or excess amounts of other fuel so that the fuel is not entirely oxidized within the combustor. Rather, an exhaust stream including carbon dioxide and water, but also including hydrogen (and possibly also methane and carbon monoxide) is included within the exhaust of the combustor.

This exhaust stream is routed to the fuel inlet of the fuel cell. The fuel cell reacts the oxygen and the hydrogen (and possibly beneficially reacts with other exhaust products) to produce water (and possibly carbon dioxide). Other constituents of the exhaust entering the fuel inlet of the fuel cell are preferably bypassed around the fuel cell stack itself, but remain within the exhaust. Preferably, the exhaust of the fuel cell is passed through a heat exchanger to preheat the oxygen entering the fuel cell. This exhaust stream is then routed to an intermediate pressure turbine.

FIG. 5 includes numbers adjacent components which indicate pressure (psia) first, temperature (° F.) second and occasionally flow rate (lbs/s) third. Power requirements of the various components are also listed in megawatts (MW) adjacent many of the components. FIG. 5 also lists many of the overall outputs and efficiencies of the overall system. This rotation on FIG. 5 is also used on FIG. 4.

While the exhaust in the fuel cell can be routed directly to the intermediate pressure turbine, performance can be enhanced by routing the exhaust through the reheater. The reheater typically includes a fuel inlet for inputting of methane, natural gas, syngas or other fuels. The reheater can additionally be utilized to combust any remaining combustible constituents which exited the combustor and did not react within the fuel cell. The reheater can utilize excess oxygen (as particularly disclosed in U.S. patent application Ser. No. 09/178,364, incorporated herein by reference) exiting the fuel cell as the oxidizer or can have a separate feed of oxygen from the air separation plant feeding the reheater.

Typically, a low pressure turbine is located below the intermediate pressure turbine with or without the reheater included therein. The exhaust exiting the low pressure turbine is preferably substantially entirely carbon dioxide and water and potentially only water if the combustor and reheater use hydrogen as the fuel. If needed, a condenser can be provided to separate the carbon dioxide and water with the water optionally being utilized for blade cooling and recirculated to the combustor. Some excess water is also typically generated.

Any carbon dioxide, once separated from the water, can be treated as necessary for industrial use. In one scenario, the CO2 is pressurized (and possibly cooled and liquefied) so that it can be conveniently transported and/or injected into a terrestrial formation for sequestration out of the atmosphere. One typical terrestrial formation for such sequestration would be a depleted oil well where the carbon dioxide could be used to enhance oil recovery out of the oil well.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified. When a component or other element is described as "downstream" or "upstream" of another component or element, such a description should be interpreted to mean anywhere downstream or upstream including directly downstream or upstream with nothing therebetween or indirectly downstream or upstream with other components or elements optionally interposed therebetween. When the term fluid is used, it is intended to include gases, liquids and any solids or other states of matter capable of flowing. While many disclosed systems of this invention include CO2 capture, water recirculation, air separation units, electrical generators, compressors, separators and other accessory components, these accessory components are not necessary for all forms of this invention. Rather, any system reacting fuel with oxygen both in a fuel cell and in a combustor should be interpreted as enabled by the systems disclosed above with the accessory components removed.

What is claimed is:

1. A combined fuel cell and fuel combustion power generation system, comprising in combination:

a source of a first fuel, the first fuel containing hydrogen;

a source of oxygen;

a fuel cell downstream from said source of fuel and said source of oxygen, said fuel cell having a discharge for at least fuel cell products produced within said fuel cell including water, said fuel cell having an output for electrical power, and said fuel cell adapted to convert at least a portion of the first fuel and the oxygen into the fuel cell products while releasing electrical power from said output;

a combustor downstream from said fuel cell discharge, said combustor adapted to combust a second fuel with oxygen in the presence of the fuel cell products from said discharge, the second fuel including hydrogen, said combustor adapted to produce elevated temperature and elevated pressure combustion products including water, said combustor including an exhaust for a mixture of the combustion products and the fuel cell products, the mixture including water;

an expander downstream from said combustor exhaust, said expander having a power outlet, said expander adapted to produce power by expanding the mixture of the combustion products and the fuel cell products, and release the power through said power outlet; and wherein said source of oxygen includes an air separation unit having an air inlet and an oxygen enriched air outlet, said air separation unit adapted to separate at least a portion of nitrogen out of the air entering said air separation unit from said air inlet, such that fluids at said oxygen enriched air outlet have a greater amount of oxygen therein than is present in the air at said air inlet.

2. The system of claim 1 wherein said oxygen enriched air outlet contains a majority oxygen.

3. The system of claim 2 wherein said oxygen enriched air outlet contains substantially pure oxygen.

4. The system of claim 1 wherein said air separation unit is adapted to liquefy at least a portion of the air entering said air separation unit from said air inlet to separate at least a portion of nitrogen from the air.

5. A combined fuel cell and fuel combustion power generation system, comprising in combination:

a source of a first fuel, the first fuel containing hydrogen;

a source of oxygen;

a fuel cell downstream from said source of fuel and said source of oxygen, said fuel cell having a discharge for at least fuel cell products produced within said fuel cell including water, said fuel cell having an output for electrical power, and said fuel cell adapted to convert at least a portion of the first fuel and the oxygen into the fuel cell products while releasing electrical power from said output;

a combustor downstream from said fuel cell discharge, said combustor adapted to combust a second fuel with oxygen in the presence of the fuel cell products from said discharge, the second fuel including hydrogen, said combustor adapted to produce elevated temperature and elevated pressure combustion products including water, said combustor including an exhaust for a mixture of the combustion products and the fuel cell products, the mixture including water;

an expander downstream from said combustor exhaust, said expander having a power outlet, said expander adapted to produce power by expanding the mixture of the combustion products and the fuel cell products, and release the power through said power outlet;

wherein at least one of said fuels includes carbon therein and a portion of the mixture of the fuel cell products and the combustion products includes carbon dioxide at said combustor exhaust;

wherein a separator is located downstream from said combustor, said separator separating at least a portion of the water from a portion of the carbon dioxide within the mixture of the fuel cell products and the combustion products;

wherein said separator is located downstream from said expander; and wherein a compressor is located downstream from a CO2 outlet of said separator, said compressor sufficiently compressing the CO2 for injection of the CO2 into a terrestrial formation spaced from the atmosphere.

6. The system of claim 5 wherein said terrestrial formation is an at least partially depleted oil well.

* * * * *